J. P. MÜLLER
TOY MOTION PICTURE APPARATUS
Filed Oct. 26, 1921   2 Sheets-Sheet 1
1,523,274
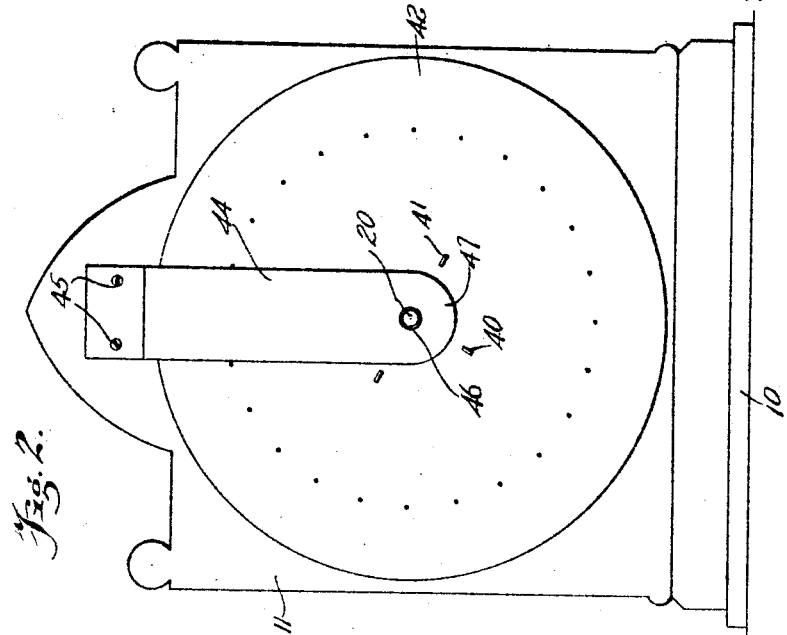
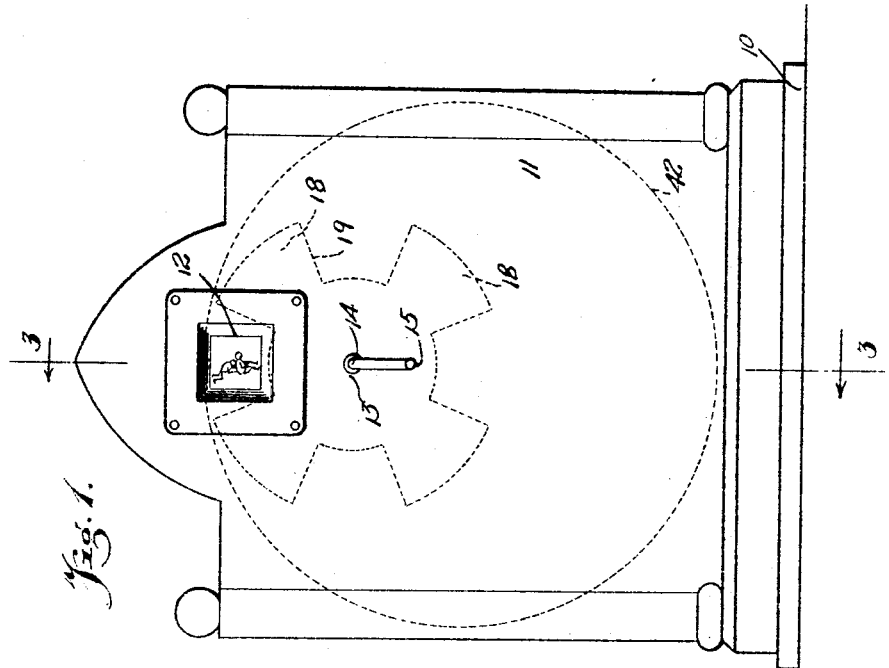
WITNESSES
INVENTOR
JOHN P. MÜLLER
BY
ATTORNEYS

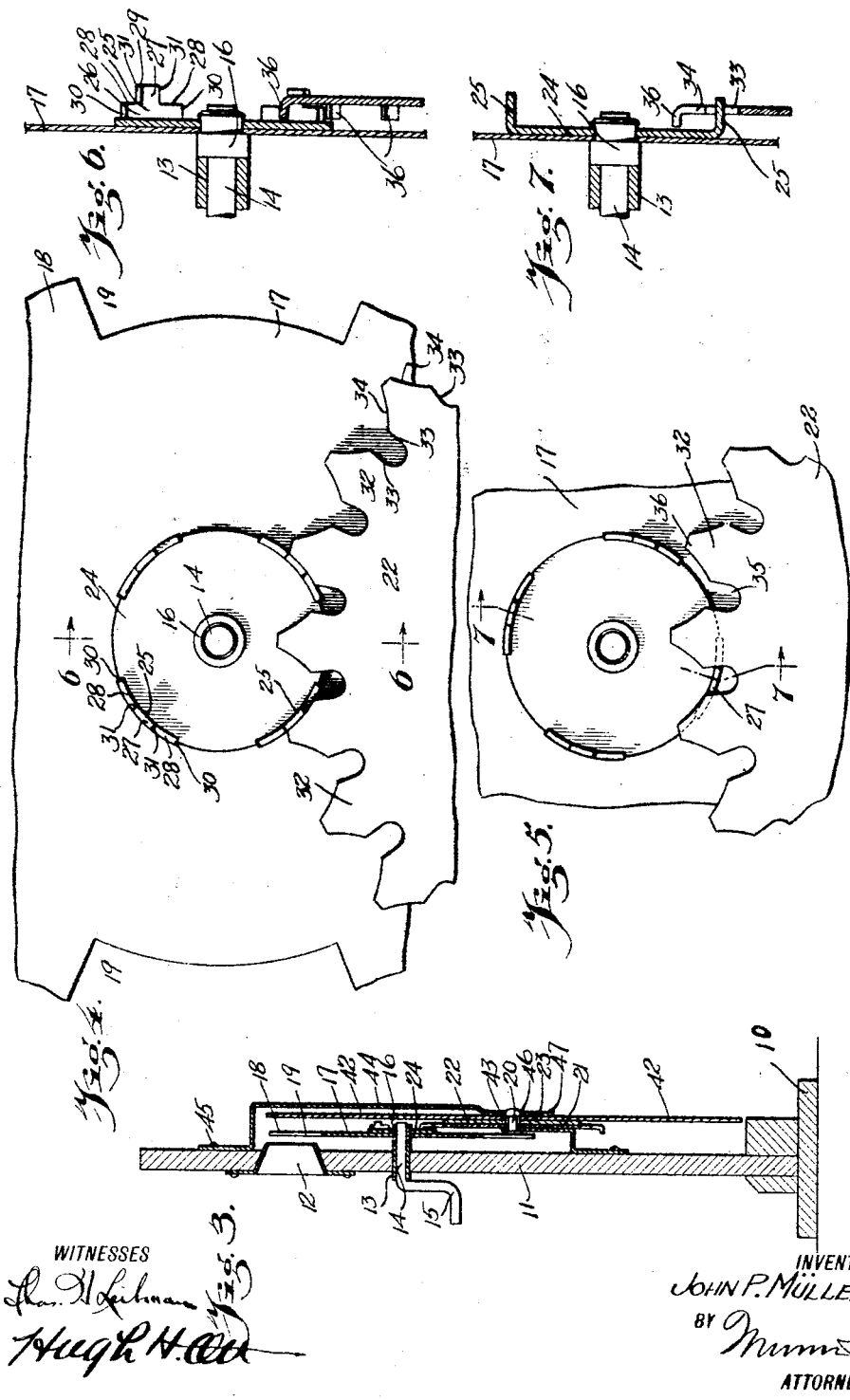

Patented Jan. 13, 1925.

1,523,274

UNITED STATES PATENT OFFICE.

JOHN P. MÜLLER, OF NEW ROCHELLE, NEW YORK, ASSIGNOR, BY DIRECT AND MESNE ASSIGNMENTS, OF ONE-HALF TO MATHILDA MÜLLER, AND ONE-HALF TO ALBERT GLATZ, BOTH OF NEW ROCHELLE, NEW YORK.

TOY MOTION-PICTURE APPARATUS.

Application filed October 26, 1921. Serial No. 510,509.

*To all whom it may concern:*

Be it known that I, JOHN P. MÜLLER, a citizen of the United States, and a resident of New Rochelle, in the county of Westchester and State of New York, have invented a new and Improved Toy Motion-Picture Apparatus, of which the following is a full, clear, and exact description.

This invention has relation to a motion picture apparatus and more particularly to an apparatus of this character especially designed as a toy.

The invention primarily contemplates an extremely simple and highly amusing and attractive toy motion picture apparatus for the successive display of pictures or drawings of figures or objects in different positions or postures either by direct view of the same through an aperture or by the casting of light reflections through the picture vehicle to project the same on a screen.

As a further object the invention contemplates in a motion picture apparatus which includes a shutter and a picture vehicle or picture bearing member, a novel gear mechanism for intermittently moving the picture vehicle from a continuously moving shutter.

As a still further object the invention contemplates a simple and ready means of detachably associating the picture vehicle with the apparatus in order to effect changes of the subject to be displayed.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed and by variation in the phraseology of the same.

In the drawings—

Figure 1 is a front elevation of the apparatus.

Fig. 2 is a rear view thereof.

Fig. 3 is a vertical sectional view therethrough taken approximately on the line 3—3 of Fig. 1.

Fig. 4 is an enlarged fragmentary rear view of the gearing for driving the picture vehicle intermittently from the shutter and disclosing the arrangement of the gears when the picture vehicle is at rest.

Fig. 5 is a similar view illustrating the relative position of the gears during the movement of the picture vehicle.

Fig. 6 is a sectional view taken approximately on the line 6—6 of Fig. 4.

Fig. 7 is a similar view taken approximately on the line 7—7 of Fig. 5.

Referring to the drawings by characters of reference, 10 designates a base provided with an upstanding wall 11 having an aperture 12 preferably disposed adjacent the upper portion thereof. A bearing sleeve 13 extending through the wall 11 below the aperture 12 has rotatably mounted therein a shutter shaft 14, the forward extremity of which is formed into a crank handle 15. The rear extremity of the shutter shaft protrudes beyond the bearing sleeve 13 and has secured thereon the hub 16 of a shutter 17 provided with radially disposed blades 18 defining therebetween spaces 19, the blades and spaces being approximately of equal areas whereby upon continuous rotation of the shutter the aperture 12 will be successively covered and uncovered by the registration of the blades 18 and spaces 19 therewith. At a suitable distance below the shutter shaft 14, a stationary stub shaft 20 is supported from a bearing bracket 21 and a driven gear 22 is rotatably mounted on the stub shaft 20 and has secured to the rear thereof a bearing plate 23. A driving gear 24 is secured to the hub 16 and shutter 17 and is interengageably associated with the driven gear 22 for intermittently driving the same upon continuous rotation of the shutter shaft 14. In order to obtain the intermittent driving of the gear 22 from the gear 24, the said gears are provided with specially constructed teeth as follows. The driving gear 24 is provided with arcuate peripheral rearwardly projecting teeth 25 struck concentrically from the axial center thereof and equi-distantly spaced circumferentially. Each tooth 25 is of substantially T-formation in elevation to provide a substantially wide base 26 at its juncture with the periphery of the gear and a relatively narrow central rearward projection 27 defining rearwardly stepped edges 28 and 29, the former being disposed at opposite sides of the rearward projection 27 at its juncture with the base 26, the base 26 of each tooth defining opposite side walls 30 and the projection 27 defining opposite side walls 31. The driven gear 22 is provided with radially disposed teeth 32 having inner side edges 33 struck radially from the common axial center of the gear and outer concaved side walls 34, the said opposing concaved side walls of alternate teeth 32 being struck from a common center, the radius of which is equal to the radius of the outer surface of the arcuate teeth 25. The distance between the walls 33 of adjacent teeth 32 is slightly greater than the width of the projection 27 of the teeth 25 to define a receiving space 35 for said projection 27. The outer extremity of each tooth 32 is provided with a forwardly projecting bill 36, the purpose of which will be hereafter set forth. The forward face of the gear 22 is slightly spaced rearwardly of the rearwardly stepped edges 28 of the base 26 and the forward edges of the bills 36 are slightly spaced rearwardly from the rear face of the gear 24.

From the foregoing arrangement, when the shutter shaft 14 is rotated, one of the rearward projections 27 of the teeth 25 of the driving gear will engage with one of the inner side edges 33 of the teeth 32 of the driven gear to turn the driven gear a predetermined part of a revolution defined by the length of the contact of the projection with the inner side wall of the tooth. After the projection has advanced the tooth to a point where the inner side wall 33 merges into the outer concaved side wall 34 the rearward projection will engage with the arcuate side wall and the side of the bill 36 of said tooth will engage with the outer surface of the base 26 of the same tooth 25 while the rearward projection 27 of the following tooth will engage with the arcuate side wall 34 of the second following tooth 32, and the side of the bill 36 of said second following tooth will engage and coact with the outer arcuate face of the base 26 of the following tooth 25. This temporarily locks the driven gear 22 and holds the same stationary until the projection 27 of the following tooth 25 coacts with the inner side wall 33 of the following tooth 32 at which time the base of the following tooth 25 is disposed out of the path of movement of the bill 36 of the second following tooth 32 to permit the projection 27 to advance the next following tooth 32 in a like manner. The arrangement of the shutter blades relative to the gearing are such as to cause their alignment or registry with the aperture while the movement of the driven gear 22 is taking place and to cause the alignment of the spaces therebetween with the aperture when the driven gear is locked against movement.

The driven gear 22 and bearing plate 23 are provided with rearwardly projecting circumferentially spaced ears 40 which are received by similarly arranged slots 41 in the picture vehicle 42 when the same is applied to the apparatus. The picture vehicle is in the nature of a disc having a central aperture 43 for the reception of the outer extremity of the stub shaft 20. In order to provide means for retaining the picture vehicle in place and the retention of the slots 41 over the ears 40 to insure the driving of the picture vehicle with the driven gear 22, a spring tongue 44 is employed, the same being secured at one extremity to the rear face of the wall 11 as at 45. The opposite free extremity is centrally apertured as at 46 to receive and accommodate the outer end of the stub shaft 20. The inherent resiliency of the spring tongue 44 serves to normally press the picture vehicle into engagement with the bearing plate 23. The extreme outer end of the free extremity is provided with an upturned lip 47 to permit of the manipulation of the tongue to lift the same out of engagement whereby to apply or remove the picture vehicle to the apparatus. The picture vehicle is provided with a circumferentially disposed series of pictures or drawings of figures or objects in different positions or postures which are designed to be successively brought into alignment with the aperture 12 upon operation of the driven gear 22 from the shutter shaft whereby to successively display the pictures through the aperture to simulate movements of the figures or objects. If desired the picture vehicle or picture bearing member or disc may be of transparent material whereby a projecting apparatus for casting light reflections may be disposed behind the picture vehicle in alignment with the aperture for projecting pictures on a screen arranged in front and spaced from the wall 10.

I claim:

1. A toy motion picture apparatus comprising a member having an aperture therein, a rotatable shutter mounted in the rear of said member and provided with radial blades adapted to intermittently cover and uncover said aperture upon rotation of the shutter, a picture vehicle, means for detachably and rotatably mounting said picture vehicle in the rear of the shutter, a gear wheel having teeth provided with laterally and forwardly projecting bills and carried by the picture vehicle mounting, and a gear wheel having laterally and rearwardly projecting T-shaped teeth and carried by the shutter and meshing with the gear wheel of the vehicle mounting to effect intermittent registration of the pictures with the aperture when said aperture is closed by the shutter whereby to successively display the pictures through the aperture for simulating movements of the objects or figures.

2. In a toy motion picture apparatus, a wall having an aperture therein, a rotatable shutter adapted to intermittently cover and uncover the said aperture, a disc rotatably mounted in the rear of the wall and having thereon representations of figures or objects in various postures or positions, intermeshing gear wheels operated from the shutter to effect intermittent registration of the pictures with the aperture, one of the gear wheels having projections thereon and the disc being mounted on the shaft of the said gear wheel and having openings receiving the projections, and a spring for retaining the projections in engagement with the openings.

3. In a toy motion picture apparatus, the combination with a member having an aperture therein, a rotatable shutter mounted in rear of said member and provided with radial blades adapted upon rotation of the shutter to successively cover and uncover said aperture, and a rotary supporting member mounted in rear of said shutter and intermittently actuated thereby to effect a turning of the bearing member when the blades cover the aperture, of a picture vehicle comprising a disk having an annular concentric series of representations of figures or objects in various postures or positions inscribed thereon for successive display through the aperture to simulate movements of the objects or figures, and means for detachably coupling the picture vehicle with the rotary bearing member comprising slotted portions in the picture vehicle, projecting ears on the bearing member received thereby, and a spring tongue for clamping the picture vehicle against the rotary bearing member.

4. A toy motion picture apparatus including a wall having an aperture therein, a picture vehicle rotatably mounted behind said wall having pictures or drawings of objects or figures in various postures or positions thereon, a rotary shutter having radial blades adapted to intermittently cover and uncover the aperture mounted behind said wall and interposed between the picture vehicle and the wall, and means operable from the shutter for intermittently bringing the pictures on the picture vehicle successively in registry with the aperture when the same is covered by the shutter blades whereby to successively display the pictures through the aperture for simulating movements of the objects or figures, said means comprising a driving gear secured to the shutter having circumferentially spaced rearwardly projecting arcuate peripheral teeth including a wide base at their juncture with the periphery of the gear and a relatively narrow central rearward projection, and a driven gear coupled with the picture vehicle and interengageably associated with the driving gear including radially disposed circumferentially spaced teeth having inner side edges struck radially from the common axial center of the driven gear, outer concaved side walls, the said opposing concave side walls of alternate teeth being struck from a common center of a radius equal to the radius of the outer surface of the arcuate teeth of the driving gear, and a forwardly projecting bill at the outer extremity of each tooth of the driven gear.

JOHN P. MÜLLER.